(12) United States Patent
Kleinsasser

(10) Patent No.: US 7,707,967 B2
(45) Date of Patent: May 4, 2010

(54) ADJUSTABLE WATER SUPPLY FOR ANIMALS

(75) Inventor: Jonathan Kleinsasser, Ste. Agathe (CA)

(73) Assignee: Crystal Spring Colony Farms Ltd., Ste. Agathe, Manitoba (CA)

( * ) Notice: Subject to any disclaimer, the term of this patent is extended or adjusted under 35 U.S.C. 154(b) by 262 days.

(21) Appl. No.: 12/045,111

(22) Filed: Mar. 10, 2008

(65) Prior Publication Data

US 2009/0223458 A1 Sep. 10, 2009

(51) Int. Cl.
*A01K 7/00* (2006.01)
(52) U.S. Cl. ........................................ 119/75; 119/72.5
(58) Field of Classification Search .................... 119/75, 119/51.5, 53, 52.4, 52.3, 52.1, 54, 53.5, 61, 119/72, 72.5, 464, 475
See application file for complete search history.

(56) References Cited

U.S. PATENT DOCUMENTS

| | | | |
|---|---|---|---|
| 3,589,338 A * | 6/1971 | Lovitz | 119/51.01 |
| 4,348,989 A * | 9/1982 | Vik | 119/72 |
| 5,363,802 A * | 11/1994 | Huff | 119/475 |
| 5,709,170 A * | 1/1998 | Gerbo et al. | 119/72.5 |
| 6,484,667 B2 * | 11/2002 | Pelletier | 119/72.5 |

* cited by examiner

*Primary Examiner*—Yvonne R. Abbott
(74) *Attorney, Agent, or Firm*—Adrian D. Battison; Ade & Company Inc.

(57) ABSTRACT

An adjustable water supply pipe has a pair of bite nozzles at a bottom end and a wall bracket holding the pipe vertical but allowing the height of the pipe to be adjusted. The bracket has a wall plate with top and bottom plates bent outwardly to define two aligned openings for the pipe. The top plate has a slot which holds the pipe fixed in the upstanding position but with a mouth at one side to release the pipe to an inclined position. The bottom plate is inclined to the horizontal such that the upstanding pipe is jammed against sides of the opening and such that the inclined pipe is free to slide longitudinally. The top plate includes fingers which cooperate with a locking ring on the pipe to hold the pipe upright and the slot is shaped to hold a non-circular portion of the pipe against rotation.

13 Claims, 4 Drawing Sheets

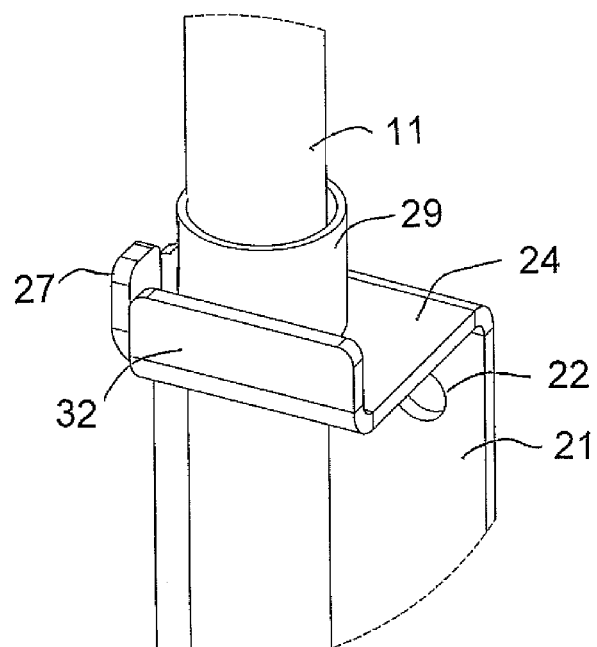
FIG. 3A
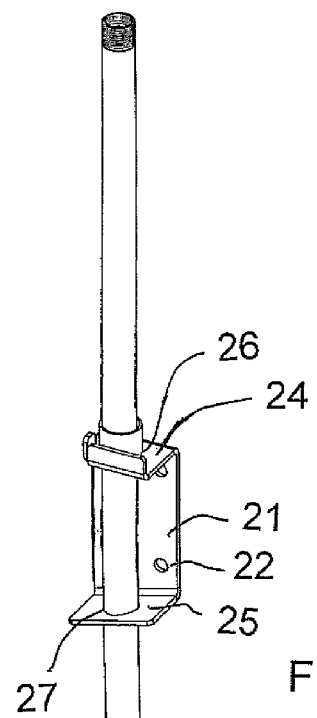
FIG. 3
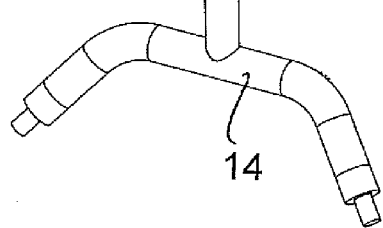

ADJUSTABLE WATER SUPPLY FOR ANIMALS

This invention relates to an adjustable water supply for animals where the height of a dispensing arrangement relative to a mounting bracket can be adjusted to accommodate changes in height of the animals as they grow.

BACKGROUND OF THE INVENTION

Animals and particularly hogs are fed water by dispensing nipples which are either of a type that the animal can bite to release a flow of water into the mouth or can be of a type which dispense water into a bowl. Typically the bite nipples are mounted in pairs side by side attached to a single vertical pipe. The bowl also is mounted to a vertical pipe.

In recent years there has been a trend to maintaining the animals in a single pen from weaning to finishing so that they grow considerably during this time. Thus a height from the floor of the water dispensing arrangement needs to be adjusted so that it is suitable for the animals at their current height. This can be done by mounting the pipe in a wall bracket and sliding the pipe upwardly as the animals grow. A number of different designs for this arrangement are known. One includes a simple screw clamp. Another includes a spring clamp where the pipe passes through holes in a spring plate which can be squeezed to release the clamping action and allow the pipe to slide. The screw clamp is cheap and resistant to animal interference but requires a tool which is inconvenient. The spring clamp requires additional components and thus is more expensive.

SUMMARY OF THE INVENTION

It is one object of the invention to provide an adjustable water supply for animals.

According to one aspect of the invention there is provided an apparatus for providing an adjustable water supply for animals comprising:

a pipe;

at least one dispensing device at a bottom end of the pipe for dispensing drinking water and a bracket for attachment to an upstanding support surface and for carrying the pipe in an upstanding position parallel to the support surface such that the position of the bracket along the length of the pipe can be adjusted to adjust the height of the pipe along the support surface and hence the height of the dispensing device from the floor;

the bracket comprising a base member for attachment to the support surface;

a first flange on the base member and arranged thereon so as to extend outwardly from the support surface with a first opening through the first flange through which the pipe passes;

a second flange on the base member and arranged thereon so as to extend outwardly from the support surface with a second opening through the second flange through which the pipe passes;

the first and second flanges being arranged with one above the other so that the pipe is held in its upstanding position by the flanges;

the first flange including parts arranged to hold the pipe fixed in the upstanding position passing through the first opening;

the parts being arranged to release the pipe such that, when released, the pipe can be moved from the upstanding position to an inclined position;

the second opening in the second flange being arranged such that when the pipe is in its upstanding position the pipe is jammed against sides of the second opening to prevent longitudinal movement of the pipe in the second flange;

the second opening in the second flange being arranged such that when the pipe is in its inclined position the pipe is free to allow longitudinal movement of the pipe in the second flange to effect the height adjustment thereof.

The first flange can be at the top or at the bottom but more preferably is at the top since this presents the upper part of the pipe easily to the worker who can move it to the inclined position for easy adjustment without tools.

Preferably the pipe has at least a portion thereof which is non-circular, for example by being slightly pinched, and which is arranged to cooperate with at least one of the first and second openings and more preferably the first or upper flange to prevent rotation of the pipe.

Preferably the parts are arranged to release the pipe such that the pipe can be moved to the inclined position by tilting to one side of the first flange generally parallel to the support surface rather than away from the wall since then the pipe can be mounted closer to the wall without interfering with the wall in its movement.

Preferably the parts are arranged such that, when released, the pipe is moved out of the first opening so that it is freed from the flange. However the flange can be shaped and arranged that the inclined position is reached while still located in and guided by the opening.

For this purpose, the first opening can be simply a slot with a mouth of the slot at one side of the first flange.

In order to hold the pipe in the upright position there is preferably provided a latch arrangement for holding the pipe in the opening. This can take any suitable shape and arrangement but one simple construction comprises an abutment, such as two upstanding fingers one on each side of the pipe, and a locking ring on the pipe which is slidable along the pipe and arranged such that when the locking ring is located at the first flange the locking ring engages the fingers to latch the pipe in the opening.

As the animals are very strong and very curious, there is preferably provided a front guard at the front of the first flange behind which the locking ring is protected to prevent the animal from lifting the locking ring and inadvertently releasing the pipe.

The bracket can be simply and cheaply formed from bent metal plate to form the base member is an upstanding plate and each of the flanges by a respective plate portion bent at an angle to the upstanding plate so as to extend outwardly from the support surface. Thus the bottom flange can comprise a plate which is inclined relative to a plane at right angles to the pipe in the upstanding position thereof and the top flange can comprise a plate with locking fingers bent upwardly from the plate.

The dispensing device can be of any suitable type and is preferably operated by the animal. In many cases the device is formed by a pair of side by side bite nipples but the same adjustment arrangement can also be used with a bowl since in all cases the height of the dispensing device should be adjusted as the animals grow.

BRIEF DESCRIPTION OF THE DRAWINGS

One embodiment of the invention will now be described in conjunction with the accompanying drawings in which:

FIG. 3 is an isometric view of the apparatus of FIG. 1 showing the pipe and water nipples in the upright fixed position.

FIG. 3A is an isometric view of the apparatus of FIG. 3 on an enlarged scale showing the pipe and water nipples in the upright fixed position.

In the drawings like characters of reference indicate corresponding parts in the different figures.

DETAILED DESCRIPTION

Figure 1:
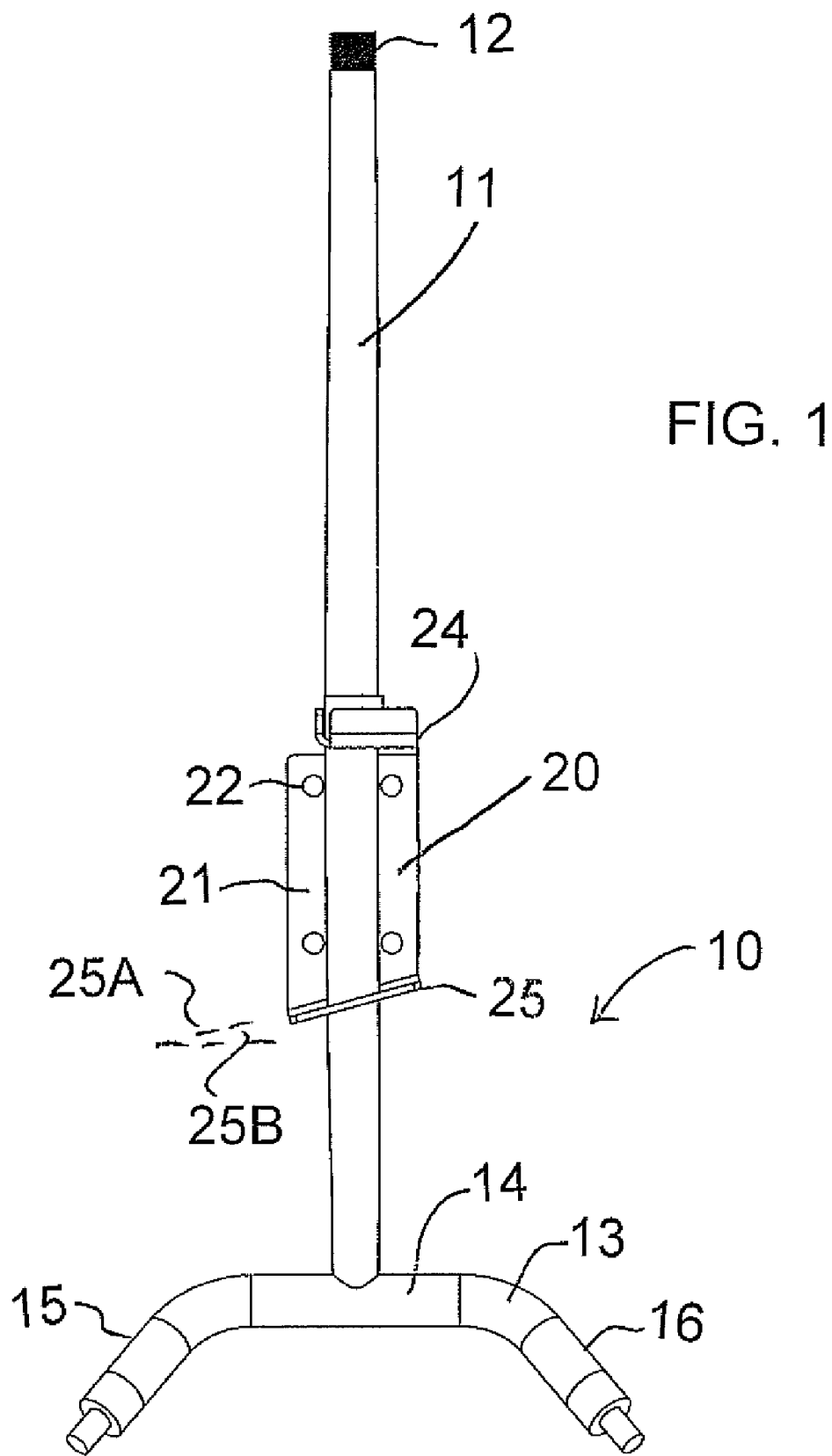
FIG. 1 is a front elevational view of an apparatus according to the present invention showing the pipe and water nipples in the upright fixed position.

As shown in the figures there is provided an apparatus 10 for providing an adjustable water supply for animals which includes a conventional metal pipe with an upper connector 12 for connection to a flexible hose from a supply (not shown). At a bottom end of the pipe is provided a T-connection 14 which carries two angle pieces 13 each connected to a respective bite nipple 15, 16 of a conventional construction. With the pipe 11 vertical against a wall, the bite nipples 15 and 16 are inclined downwardly and outwardly away from the wall so that they are accessible to the animal with its mouth projecting upwardly toward the pipe allowing water to fall into the mouth for consumption with little wasted. The same arrangement can be used with one or more nipples although the double construction is convenient and typical.

The pipe is held against a wall by a bracket 20 carrying the pipe 11 in the upstanding position parallel to the wall. In order to adjust the height of the nipples to maintain the best drinking angle, the position of the bracket 20 along the length of the pipe 11 can be adjusted to adjust the height of the pipe along the wall and hence the height of the dispensing nipple from the floor.

The bracket 20 includes a base plate member 21 with holes 22 for attachment to the wall. The base plate 21 has two flanges 24 and 25 at top and bottom respectively. The first and second flanges are arranged with one directly above the other with aligned holes 26 and 27 so that the pipe is held in its upstanding position by the flanges.

The bottom flange 25 is arranged in a plane 25A at an angle 25B to the horizontal such that when the pipe is in its upstanding position the circular pipe is jammed against sides of the circular opening 27 to prevent longitudinal movement of the pipe in the bottom flange 25.

The top flange 24 has its opening 26 formed as a slot 26A with a mouth 26B of the slot at one side 24A of the flange allowing the pipe to move out of the mouth 26B to be released from the opening 26. When released, the pipe can be moved from the upstanding position to an inclined position shown in FIG. 2 where the pipe is at right angles to the bottom flange 25. In this position the pipe can readily slide through the flange 25 for longitudinal adjustment relative to the bracket.

Figure 2:
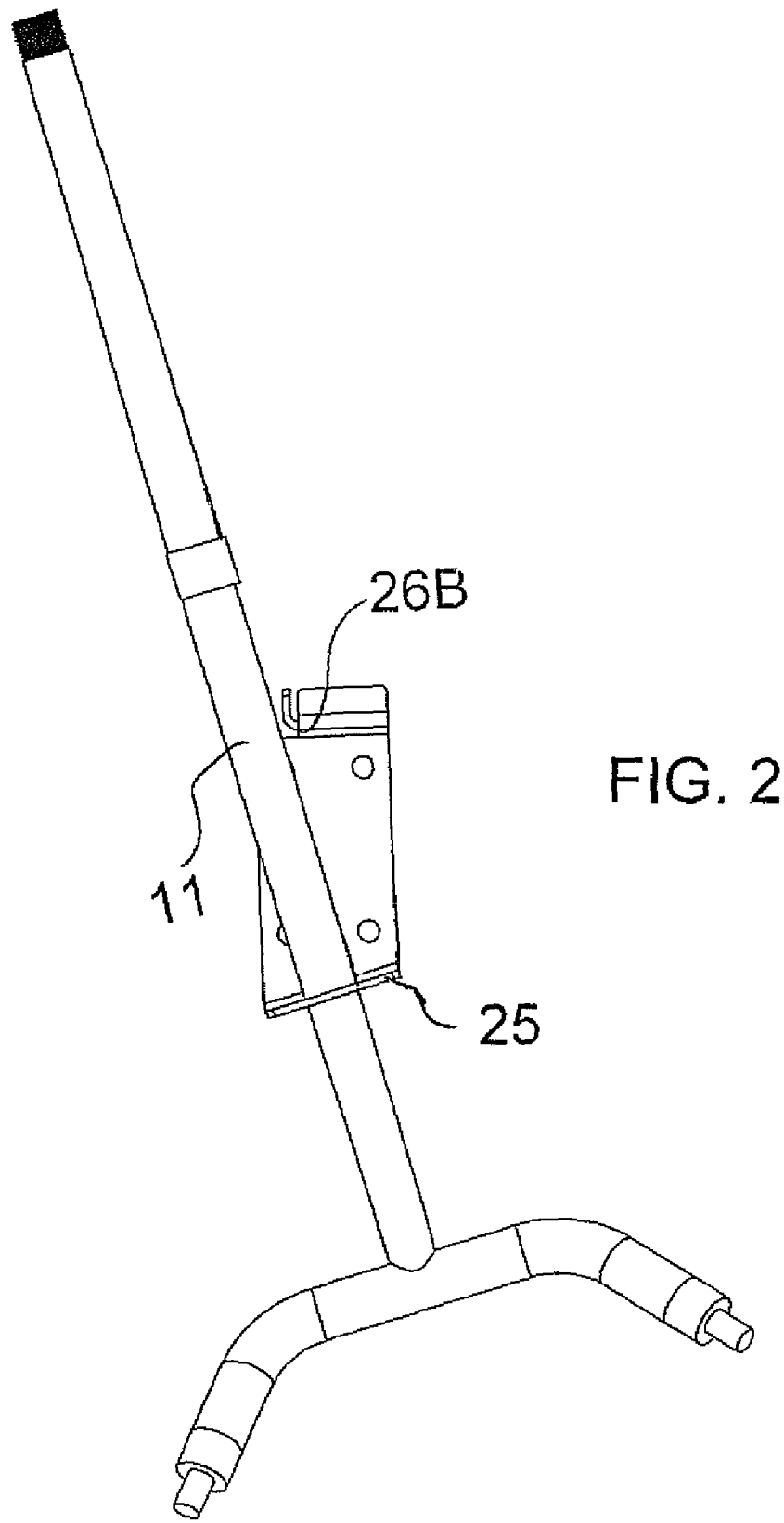
FIG. 2 is a front elevational view of the apparatus of FIG. 1 showing the pipe and water nipples in the inclined adjustment position.
Figure 4:
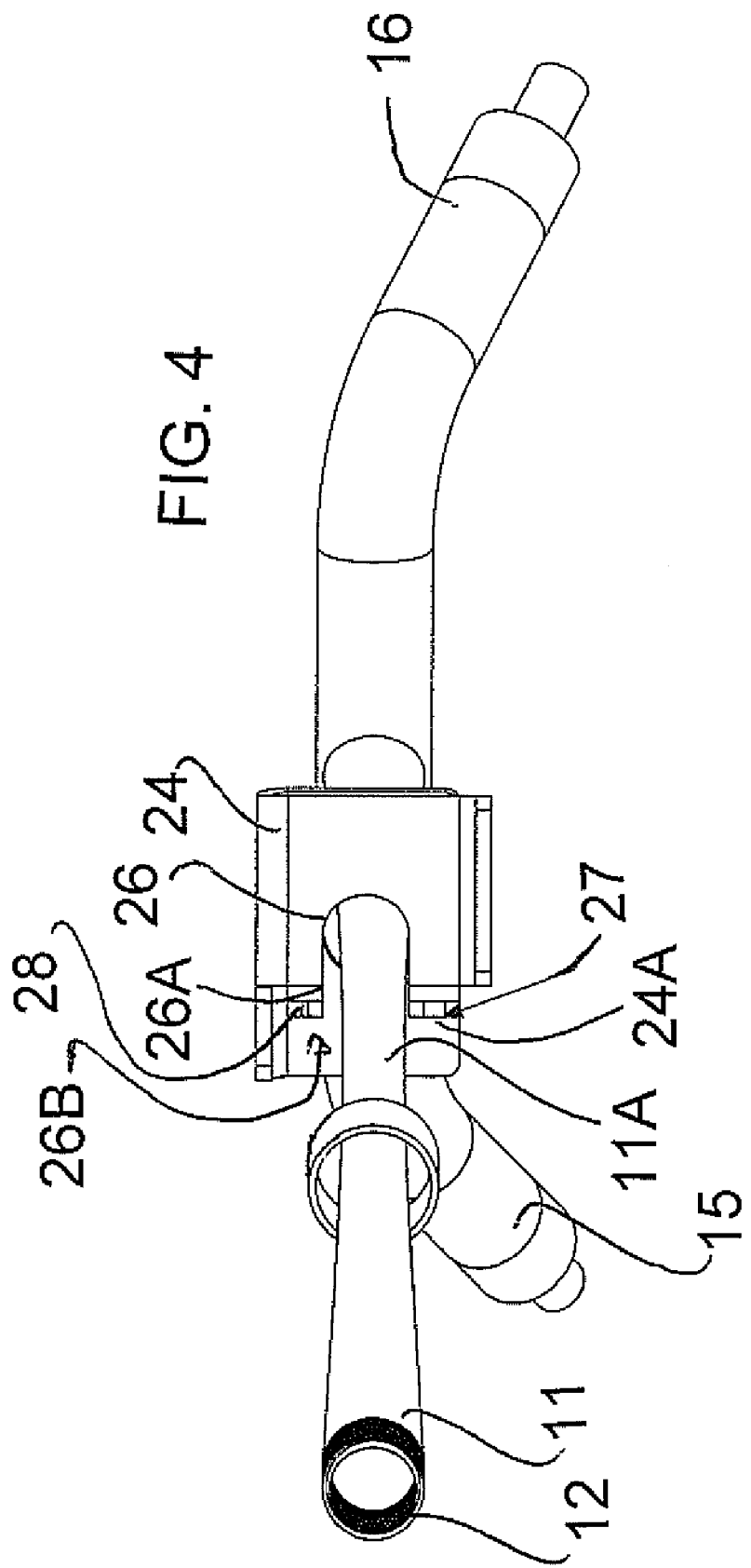
FIG. 4 is a top plan view of the apparatus of FIG. 1 showing the pipe and water nipples in the inclined adjustment position.

The pipe is latched in the opening 26 when moved to the upright fixed position by a locking ring 29 and two upstanding locking tabs 27 and 28. The ring 29 is free to slide on the circular pipe to a free raised position by the worker lifting the ring. When the ring is lifted, the narrower pipe can pass out of the mouth 26B and between the tabs 27 and 28 by moving to the side as shown in FIGS. 2 and 4. When the ring is lowered to the flange 24, the wider ring cannot pass out of the mouth 26B and is held between the tabs 27 and 28 as shown in FIGS. 1 and 3.

A front plate portion 32 at the front of the first flange 24 is located in front of the locking ring 29 behind which the locking ring is protected to prevent the animal from lifting the locking ring. In this way the snout of the animal cannot simply lift the ring by moving upwardly in a rooting action because the front plate protects the ring from engagement. It is only by the worker reaching over the front plate 32 and grasping the ring by finger and thumb while releasing the pressure of the pipe against the tabs 27 and 28 that the ring can be lifted away from the tabs 27 and 28 and the pipe allowed to move to the left to its inclined release position.

The slot 26 has a width less than the nominal diameter of the pipe and the pipe has at least a portion 11A along its length which is non-circular by a pinching action on the pipe. With the pipe oriented so that the T-piece is parallel to the wall, the pinched pipe can enter the slot 26 which is thus arranged to cooperate with the opening 26 to prevent rotation of the pipe around its axis. Thus the pipe can only be inserted in one orientation and cannot be rotated away from that orientation.

Preferably both openings 26 and 27 are so shaped to provide an increased resistance to turning and to allow the pinched section of the pipe to slide through both openings. The ring can be selected so that its inside diameter is sufficient to receive the long axis of the pinched pipe so that it is free to slide along the pipe both at the pinched and non-pinched sections. As an alternative a square pipe can be used.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for providing an adjustable water supply for animals comprising:

a pipe;

at least one dispensing device at a bottom end of the pipe for dispensing drinking water and a bracket for attachment to an upstanding support surface and for carrying the pipe in an upstanding position parallel to the support surface such that the position of the bracket along the length of the pipe can be adjusted to adjust the height of the pipe along the support surface and hence the height of the dispensing device from the floor;

the bracket comprising a base member for attachment to the support surface;

a first flange on the base member and arranged thereon so as to extend outwardly from the support surface with a first opening through the first flange through which the pipe passes;

a second flange on the base member and arranged thereon so as to extend outwardly from the support surface with a second opening through the second flange through which the pipe passes;

the first and second flanges being arranged with one above the other so that the pipe is held in its upstanding position by the flanges;

the first flange including parts arranged to hold the pipe fixed in the upstanding position passing through the first opening;

the parts being arranged to release the pipe such that, when released, the pipe can be moved from the upstanding position to an inclined position;

the second opening in the second flange being arranged such that when the pipe is in its upstanding position the pipe is jammed against sides of the second opening to prevent longitudinal movement of the pipe in the second flange;

the second opening in the second flange being arranged such that when the pipe is in its inclined position the pipe is free to allow longitudinal movement of the pipe in the second flange to effect the height adjustment thereof.

2. The apparatus according to claim 1 wherein the pipe has at least a portion thereof which is non-circular and which is arranged to cooperate with at least one of the first and second openings to prevent rotation of the pipe.

3. The apparatus according to claim 1 wherein the pipe has at least a portion thereof which is non-circular and which is arranged to cooperate with the first opening to prevent rotation of the pipe in the first opening.

4. The apparatus according to claim 1 wherein the parts are arranged to release the pipe such that, when released, the pipe can be moved to the inclined position by tilting to one side of the first flange generally parallel to the support surface.

5. The apparatus according to claim 4 wherein the parts are arranged such that, when released, the pipe is moved out of the first opening.

6. The apparatus according to claim 5 wherein the first opening comprises a slot with a mouth of the slot at one side of the first flange.

7. The apparatus according to claim 5 wherein the first opening comprises a slot with a mouth of the slot allowing the pipe to move out of the mouth to be released from the opening and wherein there is provided a latch for holding the pipe in the opening.

8. The apparatus according to claim 7 wherein the latch comprises an abutment and a locking ring on the pipe which is slidable along the pipe and arranged such that when the locking ring is located at the first flange the locking ring engages the abutment to latch the pipe in the opening.

9. The apparatus according to claim 8 wherein the abutment comprises a pair of upstanding fingers one on each side of the mouth.

10. The apparatus according to claim 8 wherein there is provided a front plate portion at the front of the first flange behind which the locking ring is protected to prevent the animal from lifting the locking ring.

11. The apparatus according to claim 1 wherein the second flange comprises a plate which is inclined relative to a plane at right angles to the pipe in the upstanding position thereof.

12. The apparatus according to claim 1 wherein the first flange comprises a plate with locking fingers bent upwardly from the plate.

13. The apparatus according to claim 1 wherein the base member is an upstanding plate and each of the flanges is defined by a respective plate portion bent at an angle to the upstanding plate so as to extend outwardly from the support surface.

* * * * *